Figure 1:
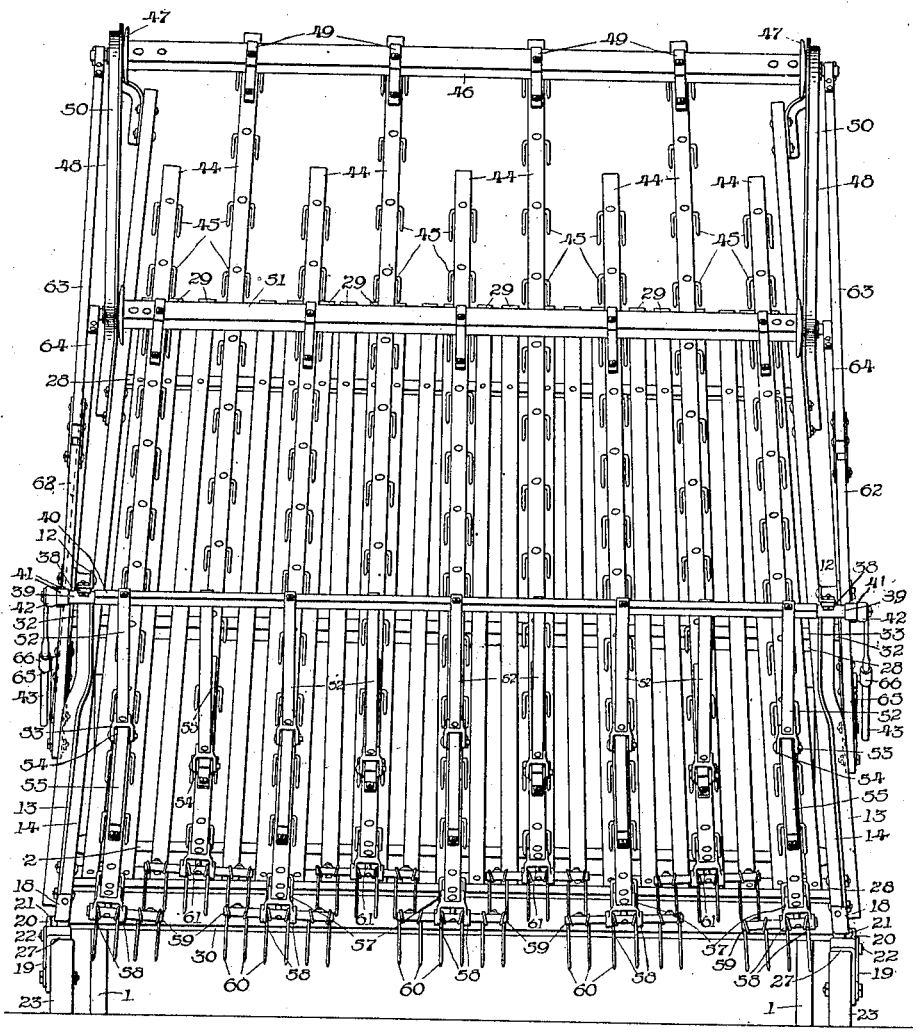

S. K. DENNIS.
HAY LOADER.
APPLICATION FILED FEB. 27, 1909.

926,177.

Patented June 29, 1909.
3 SHEETS—SHEET 1.

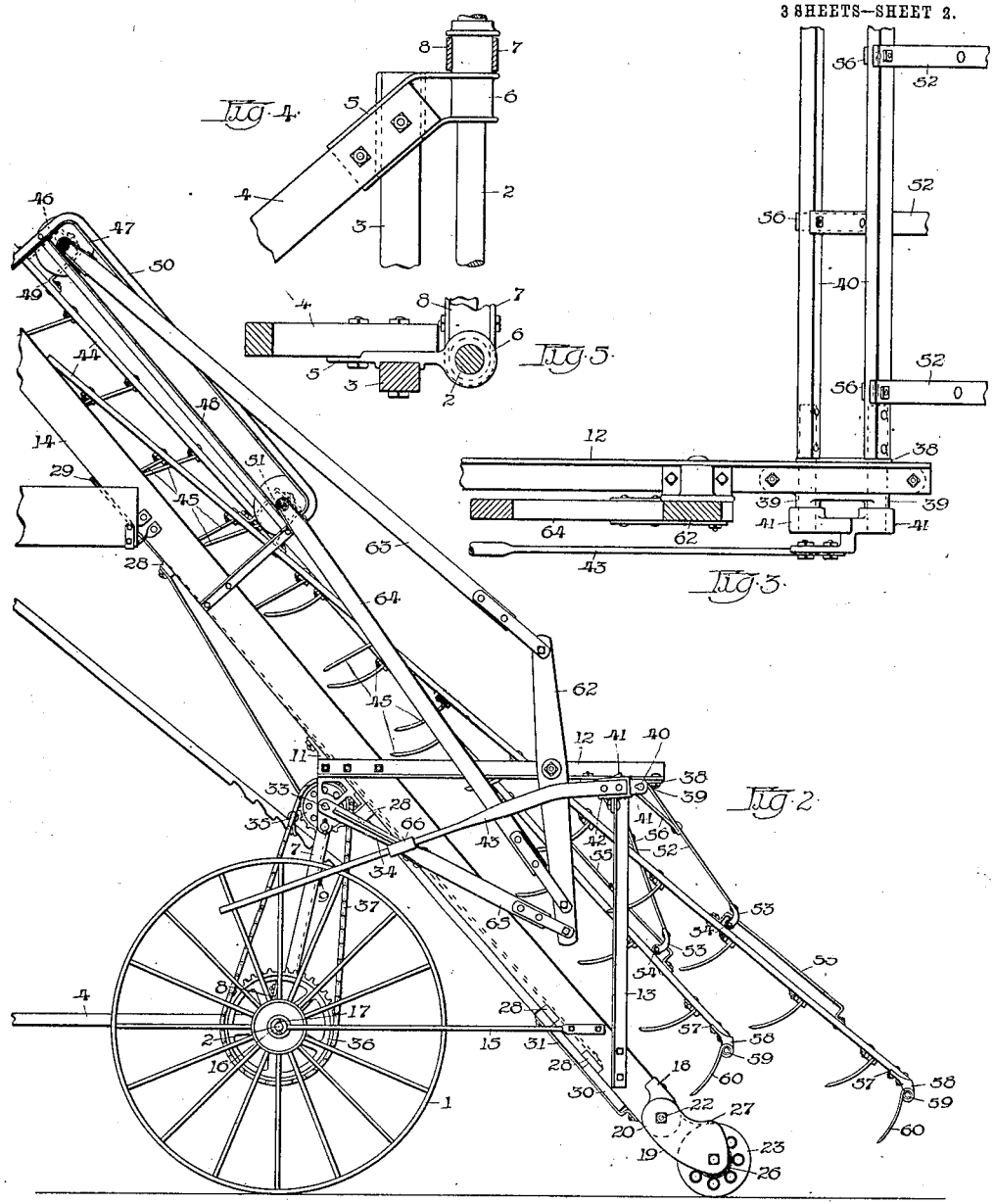

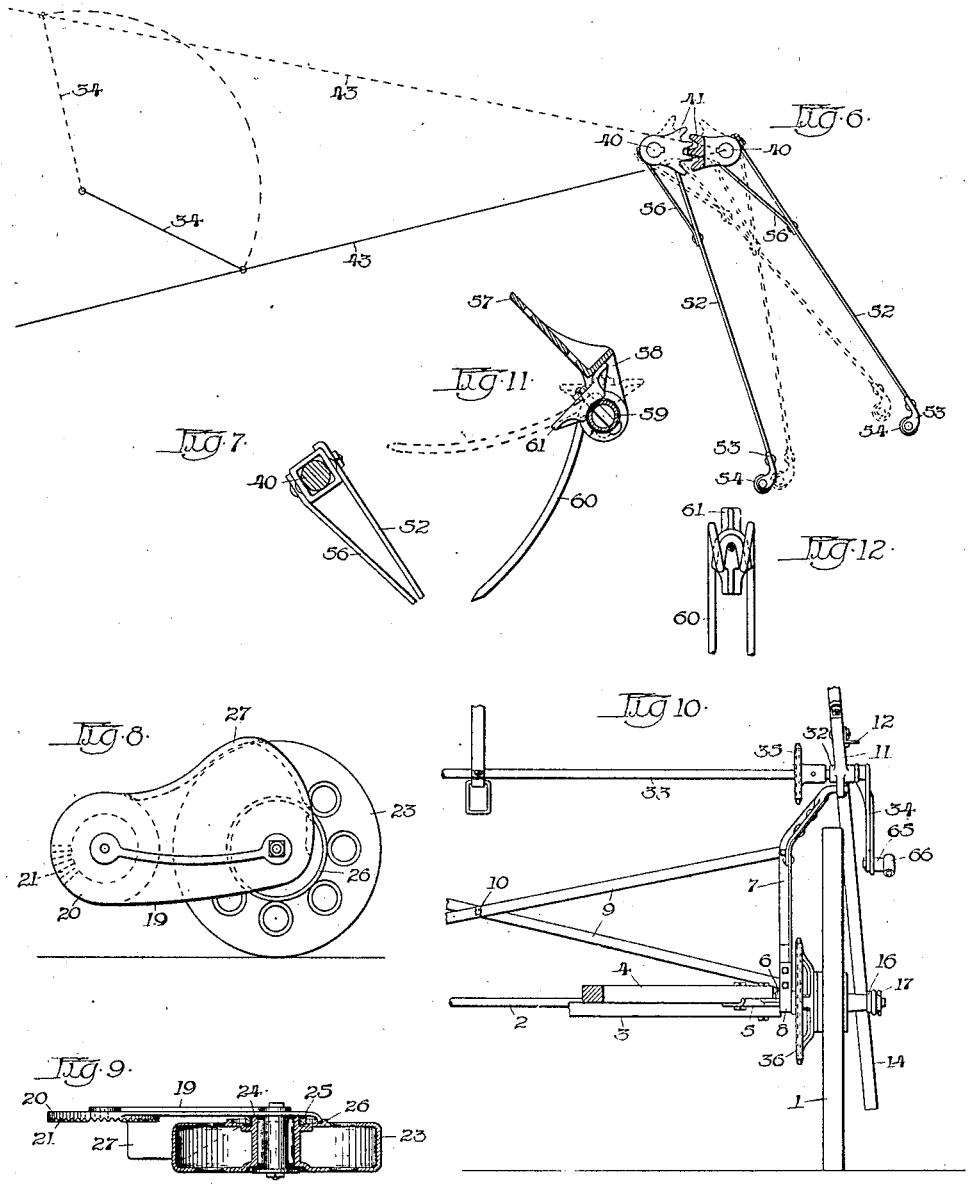

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

HAY-LOADER.

No. 926,177.      Specification of Letters Patent.      Patented June 29, 1909.

Application filed February 27, 1909. Serial No. 480,425.

*To all whom it may concern:*

Be it known that I, SAMUEL K. DENNIS, a citizen of the United States, residing at Chicago, in the county of Cook and State of Illinois, have invented certain new and useful Improvements in Hay-Loaders, of which the following is a specification.

My invention relates to hay loaders of the swinging rake type, and consists in improved means for imparting to the rakes a combined longitudinal and rising and falling movement; in the manner of mounting the rake heads at the lower ends of the rake bars; in means for supporting the lower end of the main frame upon the ground, and in providing a floating extension for the elevator deck at its lower end; the object of my invention being to construct a machine having few parts, strong, durable and efficient in operation. These objects are attained by means of the mechanism illustrated by the accompanying drawing, in which—

Figure 1 is an end elevation of a hay loader having my invention forming a part thereof; Fig. 2 is a side elevation of Fig. 1; Fig. 3 is a detached top view of part of the rake bar controlling mechanism; Fig. 4 is a detached detail drawing of part of the draft frame and illustrating the manner of connecting it with the axle of the machine; Fig. 5 is an end elevation of Fig. 4; Fig. 6 is a detached detail drawing of part of the rake bar controlling mechanism and illustrating its mode of operation; Fig. 7 is a detached detail of part of Fig. 6, shown partly in section; Fig. 8 is a side elevation of the adjustable wheel support at the lower end of the elevator frame; Fig. 9 is a bottom view of Fig. 8, partly in section; Fig. 10 is a front elevation of part of Fig. 2; Fig. 11 is a detached detail drawing representing the manner of mounting the rake heads at the lower ends of the rake bars; and Fig. 12 is a detached detail of part of Fig. 11.

The same reference characters designate like parts throughout the several views.

The loader is mounted upon carrying and traction wheels 1 mounted upon opposite ends of an axle 2.

3 represents a transverse member arranged parallel with the axle and forming part of the draft frame of the machine, and 4 is one of a pair of draft frame members having their rear ends secured to castings 5 at opposite sides of the machine, and to which is also secured opposite ends of the transverse member 3, the castings having integral therewith bearing portions 6 in which the axle is journaled; the draft frame members 4 converging forward in a common way and forming means for attaching the loader to a wagon.

7 is one of a pair of vertically arranged frame members at opposite sides of the draft frame, having secured to their lower ends castings 8 that have a bearing upon castings 5, in which the axle is journaled, and 9 represents transversely arranged brace members having their opposite ends secured to the vertical members, said brace members crossing at their central portion and secured together by means of a bolt 10. The upper ends of the vertical members are turned outward and secured thereto by castings 11, to which are secured the forward ends of frame members 12 that extend rearward in substantially a horizontal plane, and secured to their rear ends are vertical frame members 13.

14 represents side members of the elevator frame, having their middle portion secured to the forward ends of frame members 12 and to castings 11, the said frame members being inclined upward from rear to front of the machine and having their lower ends secured to the lower ends of the vertical members 13; and 15 represents brace members having their rear ends secured to said frame members 14 and their forward ends provided with eye portions 16 that receive the outer ends of the axle; and 17 represents cotter keys that retain them in place thereon.

Secured to the lower ends of the side members of the elevator frame are castings 18 that are provided with vertically arranged bearing surfaces upon their outer sides having central transverse openings therein and provided with radially arranged corrugations, and adjustably secured to said castings are arms 19 provided with boss portions 20 having radial corrugations 21 upon their inner surfaces adapted to engage with the corrugated surfaces of castings 18; the parts being secured in adjusted relation by means of bolts 22. Journaled at the lower ends of the arms, upon their inner sides, are supporting wheels 23, having outwardly extending hub portions 24 that are surrounded by sand bands 25 forming part of said arms. The wheels are also provided with annular concentric ribs 26 upon their outer sides, and the lower ends of the arms are turned inward within the ribs in a manner to prevent hay from winding upon the hub of the wheel; and 27 represents inwardly projecting wings arranged upon the edge of the arms in a manner to shield the upper forward periphery of the wheels.

The lower end of the elevator may be adjusted toward or from the ground by means of the adjustable arms 19. The elevator frame is provided with a series of transverse bars 28 having their opposite ends secured to the lower sides of the side frame members, and 29 represents deck members secured to the transverse bars.

Below the transverse frame member, at the lower end of the elevator, is arranged a board 30 extending transversely across the frame and supported at its opposite ends by means of bars 31 secured to the lower edges of the side frame members, the board being free to slide upward under the deck of the elevator to accommodate itself to the varying masses of hay being operated upon, the board being a floating extension of the deck at its lower end.

Journaled in bearings 32, forming part of castings 11, is a transverse shaft 33, having secured to opposite ends thereof, outside of said castings, cranks 34. Inside of said bearings, and secured to the shaft, are sprocket wheels 35, and 36 represents a sprocket wheel secured to the axle and operative to transmit motion therefrom to said transverse shaft by means of sprocket chains 37. Secured to the rear ends of frame members 12 are castings 38, having transverse bearings 39, in which are journaled a pair of parallel rock shafts 40, having secured to opposite ends thereof intermeshing gear segments 41, the gear segments being provided with crank arms 42, to which are secured the rear ends of levers 43.

44 represents rake bars that are arranged in two gangs above the elevator deck and provided with depending teeth 45 spaced apart and secured to the lower sides of the bars and operative to move the hay upward upon the elevator deck when the rake bars are moved longitudinally relative thereto.

46 represents a bar arranged transversely across the upper end of the elevator above the rake bars, and journaled thereto, at opposite ends thereof, are flanged rollers 47 that roll upon fixed tracks 48 upon opposite sides of the elevator. The rake bars of one of the gangs are suspended from bar 46 by means of brackets 49, a transverse bar 50 being placed above the rollers in a manner to limit an upward movement of the rake gangs.

51 represents a like transverse bar arranged lower down upon the elevator and upon which are secured other gangs of rake bars by means of like brackets. The lower ends of the rake bars in each gang are independently connected with the rock shafts 40, one of the gangs being connected with one shaft and the other gang with the other shaft, the connecting means being a series of resilient bars 52, having their upper ends secured to one of the rock shafts and their lower ends having secured thereto a fork member 53, in which is journaled, upon a transverse pivot, a roller 54 that engages with a bracket 55 secured to the upper side of the rake bar, the brackets permitting a longitudinal movement of the rake bars relative to the supporting bars 52, and 56 represents short supplemental bars having one end secured to the rock shaft upon the side opposite to that to which is secured the bars 52, and their opposite ends secured to said bars in a manner forming a double connection between the bars 52 and the rock shafts. To the lower ends of the rake bars are secured clips 57, having downwardly extending ear portions 58 upon opposite sides thereof that are provided with transverse openings therein that loosely receive a rake head 59, having secured thereto depending resilient rake teeth 60, the heads being adapted to rock freely in their bearings, and 61 represents clips secured to the heads between the ear portions 58 and having oppositely disposed wing portions that are adapted to contact with the clips 57 in a manner to limit a rocking movement of the heads.

Pivotally connected with the frame members 12, upon opposite sides of the machine, are vertically arranged levers 62, having their upper ends connected with opposite ends of the transverse bars 46 at the upper end of the elevator frame by means of pitmen 63, and their lower ends with opposite ends of bar 51 by means of pitmen 64; the lower ends of the levers being also connected with the cranks 34 at opposite ends of the shaft 33 by means of pitmen 65, whereby a rotative movement of the shaft and cranks allows the levers to vibrate about their pivotal connections in a manner to transmit a longitudinal movement to the separate gangs of rake bars in an opposite direction through their connection therewith. The forward ends of the levers 43, that are connected at their rear ends to the gear segments secured to the rock shafts, are slidably received by bearing blocks 66 that are journaled coaxially with the pitmen 65 upon the cranks 34 whereby a rotative movement of the cranks causes the bearing blocks to slide upon the levers and transmit thereto a rising and falling movement at their forward ends, which causes the rock shafts connected with their opposite ends to rock in an opposite direction in a manner to alternately raise and lower the rake gangs connected therewith simultaneously with their longitudinal movement, a result common to this class of machines.

What I claim as my invention, and desire to secure by Letters Patent, is:

1. A hay loader including, in combination, an elevator frame, separate gangs of longitudinally movable and rising and falling rakes, a transverse shaft journaled upon said frame and provided with cranks at opposite ends thereof, vertically arranged levers pivotally connected with said frame at opposite sides thereof, one end of said levers being connected with said cranks by means of pitmen and opposite ends thereof with the separate gangs of rakes, transverse rock shafts mounted upon said frame and connected with said rakes, means for rocking said shafts in opposite directions, said means including intermeshing gear segments secured to opposite ends of said shafts and connected with said cranks by means of levers.

2. A hay loader including, in combination, an elevator frame, separate gangs of longitudinally movable and rising and falling rakes, a transverse shaft journaled upon said frame and provided with cranks at opposite ends thereof, vertically arranged levers pivotally connected with said frame at opposite sides thereof, one end of said levers being connected with said cranks by means of pitmen and opposite ends thereof with separate gangs of rakes, transverse rock shafts mounted upon said frame, spring bars connecting the individual rake bars of one gang to one of said shafts, and like connections between the other shaft and the other gang, means for rocking said shafts in opposite directions, said means including intermeshing gear segments secured to opposite ends of said shafts and connected with said cranks by means of levers.

3. A hay loader including, in combination, an elevator frame, separate gangs of longitudinally movable and rising and falling rakes, a transverse shaft journaled upon said frame and provided with cranks at opposite ends thereof, vertically arranged levers pivotally connected with said frame at opposite sides thereof, one end of said levers being connected with said cranks by means of pitmen and opposite ends thereof with separate gangs of rakes, transverse rock shafts mounted upon said frame and connected with said rakes, means for rocking said shafts in opposite directions, said means including intermeshing gear segments secured to opposite ends of said shafts, levers having their opposite ends secured to segments at opposite sides of the machine and their forward ends slidably connected with said cranks.

4. A hay loader including, in combination, an elevator frame, separate gangs of longitudinally movable and rising and falling rakes, means for transmitting a longitudinal and rising and falling movement to said rakes, said means including a transverse shaft journaled upon said frame and having cranks secured to opposite ends thereof, lever mechanism connecting said rake gangs with said cranks in a manner to transmit longitudinal movement to said gangs, transverse rock shafts mounted upon said frame and connected with said rakes, intermeshing gear segments connected with said rake shafts, and lever connections between said segments and said cranks.

5. A hay loader including, in combination, an elevator frame, separate gangs of longitudinally movable and rising and falling rakes, means for transmitting a longitudinal and rising and falling movement to said rakes, said means including a transverse shaft journaled upon said frame and having cranks secured to opposite ends thereof, lever mechanism connecting said rake gangs with said cranks in a manner to transmit longitudinal movement to said gangs, transverse rock shafts mounted upon said frame, arms having their lower ends slidably connected with the rakes in one gang and their opposite ends secured to one side of one of said rock shafts, and short supplemental arms having one end secured to the opposite side of said rock shaft and their opposite ends secured to said first mentioned arms, and means connected with said cranks for rocking said shaft.

6. A hay loader including, in combination, an elevator frame, separate gangs of longitudinally movable and rising and falling rakes, a transverse shaft journaled upon said frame and provided with cranks at opposite ends thereof, vertically arranged levers pivotally connected with said frame at opposite sides thereof, one end of said levers being connected with said cranks by means of pitmen and opposite ends thereof with separate gangs of rakes, transverse rock shafts mounted upon said frame, arms having one end connected with said rock shafts and their opposite ends slidably connected with the individual rakes, means for rocking said shafts, said means including intermeshing gear segments secured to opposite ends of said shafts, levers having their rear ends connected with said segments and their forward ends slidably connected with said cranks, bearing blocks pivotally mounted upon said cranks coaxial with the pitmen connected thereto, the forward ends of said levers being slidably mounted in said bearing blocks.

7. A hay loader including, in combination, an elevator frame inclined upward from rear to front, said frame including side members, means for supporting the lower ends of said side members upon the ground whereby the elevator may be adjusted relative thereto, said means including castings secured to said side frame members and having a vertically arranged bearing surface having central openings therein, arms adjustably secured against said bearing surfaces, said arms having wheels journaled at their lower ends, and inwardly projecting wings arranged upon the upper edge of the arms and operative to shield the upper forward portion of the periphery of said wheels.

8. A hay loader including, in combination, an elevator frame inclined upward from rear to front, said frame including side members, means for supporting the lower ends of said side members upon the ground whereby the elevator may be adjusted relative thereto, said means including castings secured to said side frame members and having vertically arranged bearing surfaces having central openings therein, arms adjustably secured against said bearing surfaces, said arms having wheels journaled at their lower ends, said wheels having annular concentric ribs upon their outer sides, the ends of said arms being turned within said ribs, and inwardly projecting wings arranged upon the upper edge of the arms and operative to shield the upper forward portions of the periphery of the wheels.

9. A hay loader including, in combination, an elevator frame inclined upward from rear to front, said elevator including a longitudinally arranged fixed deck, a deck extension at the lower end of said fixed deck, said extension being adapted to move upward along the fixed deck under pressure thereon of varying masses of hay upon the ground.

10. A hay loader including, in combination, an elevator inclined upward from rear to front, said elevator including side frame members and a longitudinally arranged fixed deck, a deck-extension at the lower end of said fixed deck, said extension being supported at opposite ends thereof upon said side frame members in a manner permitting it to slide upward along said fixed deck under pressure thereon of varying masses of hay upon the ground.

11. A hay loader including, in combination, an elevator including a longitudinally arranged deck, a series of rakes adapted to rake the hay from the ground and conduct it along said deck, said rakes including longitudinally arranged bars, clips secured to the lower ends of said bars, said clips having depending ears at opposite sides thereof having transverse openings therein, a rake head passing through said openings, a clip secured to said rake head between said ears and said clip having oppositely disposed wing portions adapted to engage with said first mentioned clips in a manner to limit the movement of said rake head in either direction.

SAMUEL K. DENNIS.

Witnesses:
JAMES A. MOXEY,
M. VAN DER OLIET.